# (12) United States Patent
Liang

(10) Patent No.: US 11,304,247 B2
(45) Date of Patent: Apr. 12, 2022

(54) METHOD AND SYSTEM FOR INTERACTION BETWEEN SMART GLASSES AND SMART DEVICE, AND STORAGE MEDIUM

(71) Applicant: ZTE CORPORATION, Guangdong (CN)

(72) Inventor: Haitao Liang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 95 days.

(21) Appl. No.: 16/768,695

(22) PCT Filed: Dec. 27, 2018

(86) PCT No.: PCT/CN2018/124196
§ 371 (c)(1),
(2) Date: Jun. 1, 2020

(87) PCT Pub. No.: WO2019/129125
PCT Pub. Date: Jul. 4, 2019

(65) Prior Publication Data
US 2021/0176803 A1 Jun. 10, 2021

(30) Foreign Application Priority Data
Dec. 29, 2017 (CN) .......................... 201711498548.3

(51) Int. Cl.
*H04L 65/40* (2022.01)
*H04W 76/14* (2018.01)
(Continued)

(52) U.S. Cl.
CPC .......... *H04W 76/14* (2018.02); *H04W 76/30* (2018.02); *H04W 84/12* (2013.01)

(58) Field of Classification Search
CPC ................ G01R 31/389; G01R 31/367; G01R 31/3842; G01R 31/382; H02J 7/0047;
(Continued)

(56) References Cited

U.S. PATENT DOCUMENTS

| 2015/0130623 A1* | 5/2015 | Robison .................. G06F 1/163 340/636.1 |
| 2016/0262199 A1* | 9/2016 | Patil ....................... H04W 76/14 |
| 2016/0353428 A1* | 12/2016 | Kafle ............... H04N 21/42203 |

FOREIGN PATENT DOCUMENTS

| CN | 103813330 A | 5/2014 |
| CN | 104427381 A | 3/2015 |
| CN | 104584490 A | 4/2015 |

OTHER PUBLICATIONS

International search report of PCT Patent Application No. PCT/CN2018/124196 dated Apr. 3, 2019.

\* cited by examiner

*Primary Examiner* — Joseph E Dean, Jr.

(57) ABSTRACT

Disclosed are a method and a system for interaction between a pair of smart glasses and a smart device, and a storage medium. The method includes: establishing a WiFi direct communication connection between the pair of smart glasses and the smart device (S10); performing a communication negotiation between the pair of smart glasses and the smart device (S20); and performing data transmission between the pair of smart glasses and the smart device based on the WiFi direct communication connection and a result of the communication negotiation (S30).

13 Claims, 5 Drawing Sheets

(51) Int. Cl.
*H04W 76/30* (2018.01)
*H04W 84/12* (2009.01)

(58) Field of Classification Search
CPC ...... H02J 3/32; Y02B 70/3225; Y04S 20/222; H04W 76/14; H04W 76/30; H04W 84/12; H04W 4/80; H04W 12/06; H04L 65/1069; H04L 65/1059; H04L 29/08
See application file for complete search history.

METHOD AND SYSTEM FOR INTERACTION BETWEEN SMART GLASSES AND SMART DEVICE, AND STORAGE MEDIUM

FIELD OF THE INVENTION

The present disclosure relates to (but is not limited to) the technical field of communications.

BACKGROUND OF THE INVENTION

A pair of smart glasses is a wearable smart terminal that has an independent operating system, on which a user is allowed to install applications provided by a software service provider such as software and games, and can access wireless network via a mobile communication network.

At present, restricted by power consumption, processing capability and storage capability, the pair of smart glasses cannot carry a large amount of data and cannot connect to a base station or perform GPS positioning for a long time. Besides, Bluetooth is mainly used as an interaction manner between the pair of smart glasses and a smart device, but using Bluetooth for interaction has weak capability of data transmission, bad user experience, and obvious deficiencies, which results in limited application scenarios for the pair of smart glasses.

SUMMARY OF THE INVENTION

According to an embodiment of the present disclosure, a method for interaction between a pair of smart glasses and a smart device is provided. The method includes steps of: establishing a WiFi direct communication connection between the pair of smart glasses and the smart device; performing a communication negotiation between the pair of smart glasses and the smart device; and performing data transmission between the pair of smart glasses and the smart device based on the WiFi direct communication connection and a result of the communication negotiation.

Besides, an embodiment of the present disclosure further provides an interaction system, including a pair of smart glasses and a smart device. Herein, after a WiFi direct communication connection is established between the pair of smart glasses and the smart device, a communication negotiation is performed between the pair of smart glasses and the smart device, and data transmission is performed between the pair of smart glasses and the smart device based on the WiFi direct communication connection and a result of the communication negotiation.

In addition, an embodiment of the present disclosure further provides an interaction system, including a pair of smart glasses, a smart device, a memory, and a processor. Herein, a computer program is stored on the memory, and when the computer program is run by the processor, the processor executes the method for interaction between a pair of smart glasses and a smart device according to the present disclosure.

The present disclosure further proposes a computer readable storage medium, provided thereon with a computer program. Herein, when the computer program is run by the processor, the processor executes the method for interaction between a pair of smart glasses and a smart device according to the present disclosure.

DETAILED DESCRIPTION OF THE EMBODIMENTS

It should be understood that specific embodiments described herein are merely for the purpose of explaining the present disclosure and are not intended to limit the present disclosure.

At present, a pair of smart glasses and a smart device are connected via Bluetooth for interaction. Using Bluetooth for connection has weak capability of data transmission. Moreover, the interaction between the pair of smart glasses and the smart device is unidirectional transmission and control, and control and transmission directions cannot be switched freely between the pair of smart glasses and the smart device. As a result, the pair of smart glasses has limited application scenarios, and user experience is not good.

The present application provides a method and a system for interaction between a pair of smart glasses and a smart device, and a storage medium, which may realize a high-speed, bidirectional and convenient connection between the pair of smart glasses and the smart device, improve a speed of data transmission between the pair of smart glasses and the smart device, and realize bidirectional transmission and control of data.

The method for interaction between a pair of smart glasses and a smart device includes: establishing a communication connection between the pair of smart glasses and the smart device via WiFi; performing a communication negotiation between the pair of smart glasses and the smart device, contents of the communication negotiation including at least one of pieces of information such as a transmission format, an audio and video encoding format, a transmission mode and so on; and performing data transmission between the pair of smart glasses and the smart device based on a WiFi direct communication connection and a result of the communication negotiation after the communication negotiation is completed.

Figure 1:
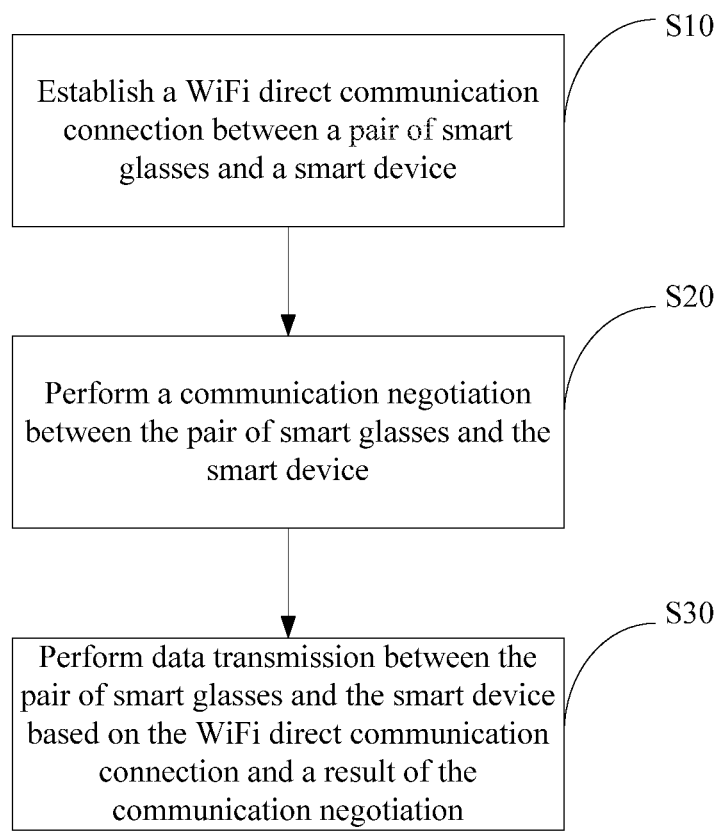
FIG. 1 schematically shows a flowchart of a method for interaction between a pair of smart glasses and a smart device according to an embodiment of the present application.

FIG. 1 schematically shows a flowchart of a method for interaction between a pair of smart glasses and a smart device according to an embodiment of the present application.

As shown in FIG. 1, the method for interaction between a pair of smart glasses and a smart device includes the following steps S10 to S30.

At step S10, a WiFi direct communication connection is established between the pair of smart glasses and the smart device.

At step S20, a communication negotiation is performed between the pair of smart glasses and the smart device. Herein, contents of the communication negotiation include at least one of pieces of information such as a transmission format, an audio and video encoding format, a transmission mode and so on.

The smart device may be a terminal device having a wireless communication connection function, such as a mobile phone, an iPad, a computer and so on.

By using the WiFi direct communication connection between the pair of smart glasses and the smart device, a one-to-one direct connection may be realized without support of a router, so that there is no restriction by the router, which enables wireless devices to interconnect in a point-to-point manner. Moreover, a WiFi direct connection standard may support all WiFi devices and support a frequency of 2.4 GHz or 5 GHz, which improves a transmission speed and a transmission distance of data relative to an existing interaction manner. In addition, a WPA2 standard may be adopted so as to improve security of data transmission.

Besides, this communication manner follows the real time streaming protocol (RTSP). The RTSP itself does not transmit continuous media streams, but plays a role of a controller for a multi-media server. Specifically, the contents of the communication negotiation include pieces of information such as the transmission format, the audio and video encoding format, playing of URL information, whether to use an RTP (real-time transport protocol) transmission in a TCP (transmission control protocol) mode and so on. For control and negotiation of transmission, an RTSP channel is used to ensure reliability of a control signaling.

At step S30, data transmission is performed between the pair of smart glasses and the smart device based on the WiFi direct communication connection and a result of the communication negotiation.

Based on the WiFi direct communication connection and the pieces of information such as the transmission format, the audio and video encoding format, the transmission mode and so on that are negotiated, the data transmission may be performed between the pair of smart glasses and the smart device. That is, interaction between the pair of smart glasses and the smart device can be realized. A user of the pair of smart glasses can play files in the smart device such as a video file with no need of arranging a memory card in the pair of smart glasses, conveniently use a positioning system and a map application of the smart device, and run an interaction game between the smart device and the pair of smart glasses, and furthermore can share an image shot by the pair of smart glasses to the smart device in real time. Accordingly, by using an interaction manner of the present disclosure, user experience can be improved greatly.

According to an embodiment of the present disclosure, a communication connection is established between a pair of smart glasses and a smart device via WiFi first; then a communication negotiation is performed between the pair of smart glasses and the smart device; and data transmission is performed between the pair of smart glasses and the smart device based on a result of the communication negotiation after the communication negotiation is completed, thereby improving a speed of the data transmission between the pair of smart glasses and the smart device, realizing a high-speed, bidirectional and convenient connection between the pair of smart glasses and the smart device, and improving user experience.

Figure 2:
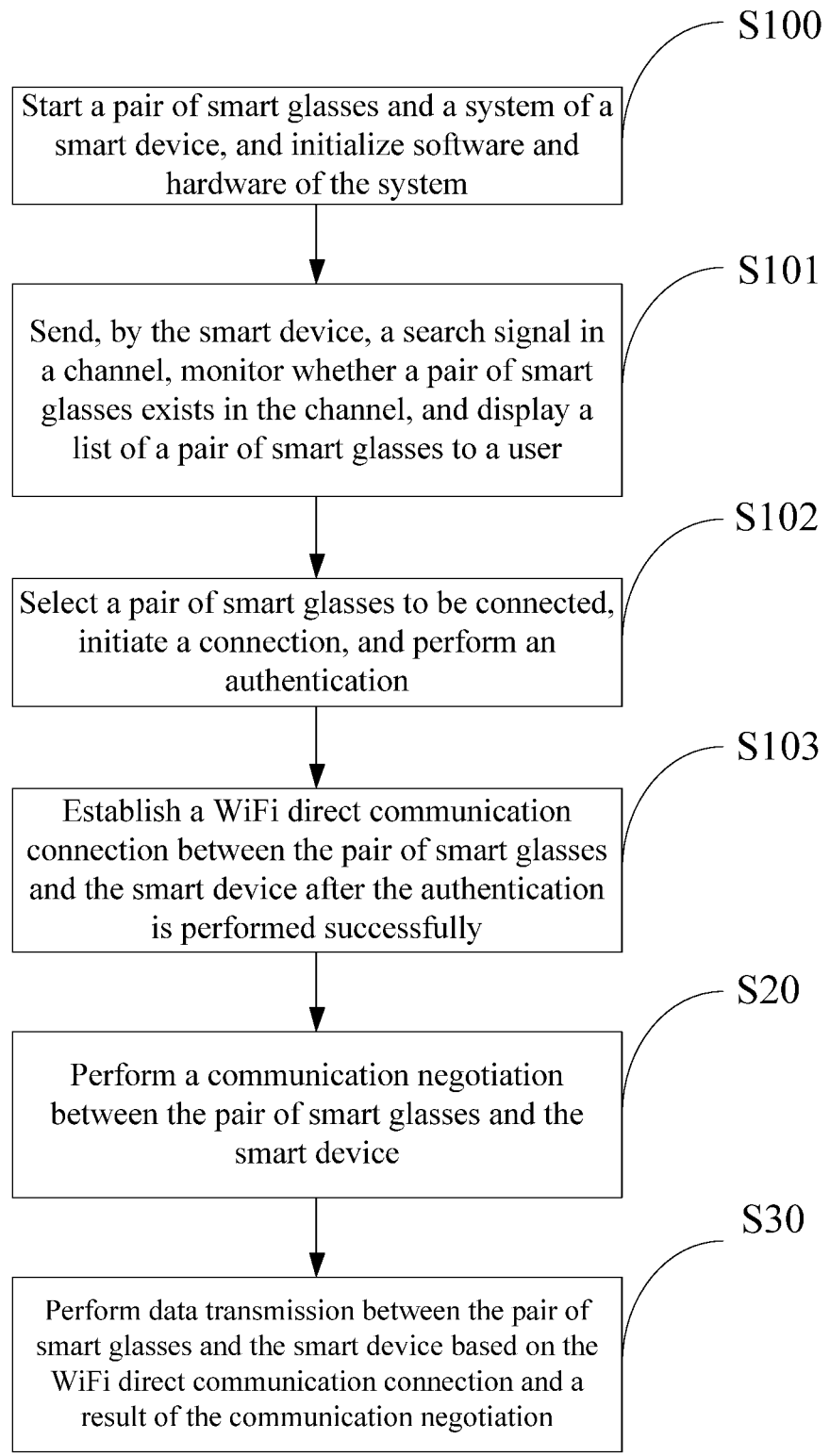
FIG. 2 schematically shows a flowchart of a method for interaction between a pair of smart glasses and a smart device according to another embodiment of the present application.

FIG. 2 schematically shows a flowchart of a method for interaction between a pair of smart glasses and a smart device according to another embodiment of the present application.

As shown in FIG. 2, step S10 in the above embodiment may include steps S100 to S103.

At step S100, a pair of smart glasses and a system of a smart device are started, and software and hardware of the system are initialized.

After the pair of smart glasses and the system of the smart device are powered on and started, the pair of smart glasses and a wireless transmission module, an audio module, a video module and so on of the smart device are initiated respectively.

At step S101, the smart device sends a search signal in a communication channel to which the smart device belongs to, monitors whether a pair of smart glasses exists in the communication channel to which the smart device belongs to, and displays a list of a pair of smart glasses to a user if a pair of smart glasses exists.

After a direct connection service of the pair of smart glasses and the smart device are started, when searching the pair of smart glasses, the smart device may send a signal to the channel, register a monitor apparatus to monitor a response result, and display a list of a pair of smart glasses to a user if it is detected that a pair of smart glasses exists in the communication channel.

At step S102, after receiving a selection instruction of the user, the smart device selects the pair of smart glasses to be connected, initiates a connection, and performs an authentication.

The authentication may be performed by using an authentication manner preset by the user, for example, by inputting a preset verification code, such as verification numbers or a verification picture, in an input interface on the smart device.

At step S103, after the authentication is performed successfully, a WiFi direct communication connection is established between the pair of smart glasses and the smart device.

Figure 3:
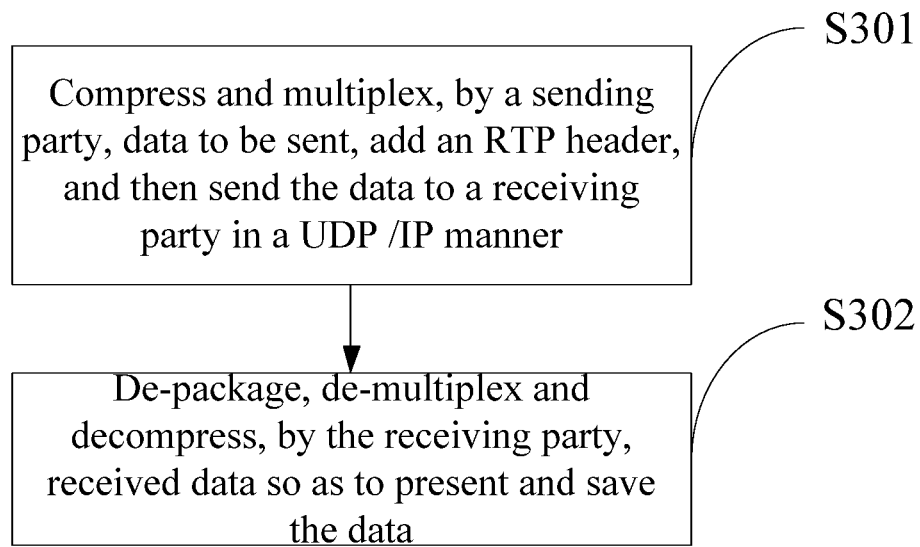
FIG. 3 schematically shows a flowchart of a method for performing data transmission between a pair of smart glasses and a smart device according to an embodiment of the present application.

FIG. 3 schematically shows a flowchart of a method for performing data transmission between a pair of smart glasses and a smart device according to an embodiment of the present application.

As shown in FIG. 3, step S30 in the above embodiment may include steps S301 to S302.

At step S301, a sending party compresses and multiplexes data to be sent, adds an RTP header, and then sends the data to a receiving party in a UDP (user datagram protocol)/IP manner.

At step S302, the receiving party de-packages, de-multiplexes and decompresses received data so as to present and save the data.

The sending party may be a pair of smart glasses, and the receiving party may be a smart device; or the sending party may be a smart device, and the receiving party may be a pair of smart glasses.

The sending party first compresses data to be sent to package the data into a packetized elementary stream (PES) format, then performs fusion and multiplexing to the data in an MPEG2-TS manner and adds an RTP header, and at last transmits the data to the receiving party in a UDP/IP manner.

The receiving party de-packages, de-multiplexes and decompresses received data so as to present and save the data.

According to an embodiment of the present disclosure, contents of communication negotiation further include negotiation to a transmission control right. The pair of smart glasses and the smart device may perform switching of control to the data transmission based on a negotiated transmission control right, so as to realize switching of a data transmission direction and of the transmission control right.

In an embodiment, the step of performing, by the pair of smart glasses and the smart device, switching of control to the data transmission based on a negotiated transmission control right includes steps of: sending, by the sending party, a message of applying for the control right to the receiving party; and releasing, by the receiving party, the current control right after the message of applying for the control right from the sending party is received, and meanwhile confirming termination of current data transmission, so as to complete switching of the data transmission direction and of the control right.

For example, the smart device compresses and multiplexes data to be sent, adds an RTP header, and then sends the data to the pair of smart glasses in the UDP/IP manner. The pair of smart glasses de-packages, de-multiplexes and decompresses received data so as to present and save the data. Subsequently, if the pair of smart glasses needs to send data to the smart device, the pair of smart glasses sends a message of applying for the control right to the smart device; and the smart device releases the control right, and meanwhile confirms termination of current data transmission, so as to complete switching of the data transmission direction and of the control right.

Likewise, the pair of smart glasses compresses and multiplexes data to be sent, adds an RTP header, and then sends the data to the smart device in the UDP/IP manner. The smart device de-packages, de-multiplexes and decompresses received data so as to present and save the data. Subsequently, if the smart device needs to send data to the pair of smart glasses, the smart device sends a message of applying for the control right to the pair of smart glasses; and the pair of smart glasses releases the control right, and meanwhile confirms termination of current data transmission, so as to complete switching of the data transmission direction and of the control right.

By adding the RTP header to a transmission control signaling and by transmitting in the UDP/IP manner, reliability of the signaling is ensured. The two parties may negotiate the control right of transmission, so as to realize bidirectional transmission and control.

By switching the data transmission direction and the control right, information stored on the smart device (such as a shot image) and data on the pair of smart glasses can be transmitted between the smart device and the pair of smart glasses with a high speed in a bidirectional manner, and interaction between the smart device and the pair of smart glasses can be more convenient, so that user experience can be improved.

After step S302, the sending party may send an instruction of disconnecting the communication connection, and the receiving party may disconnect the communication connection according to the instruction.

The sending party may either be the pair of smart glasses or be the smart device; and correspondingly, the receiving party may either be the smart device or be the pair of smart glasses.

Architecture for a method for interaction between a pair of smart glasses and a smart device according to an embodiment of the present application is explained in detail with reference to FIG. 4.

Figure 4:
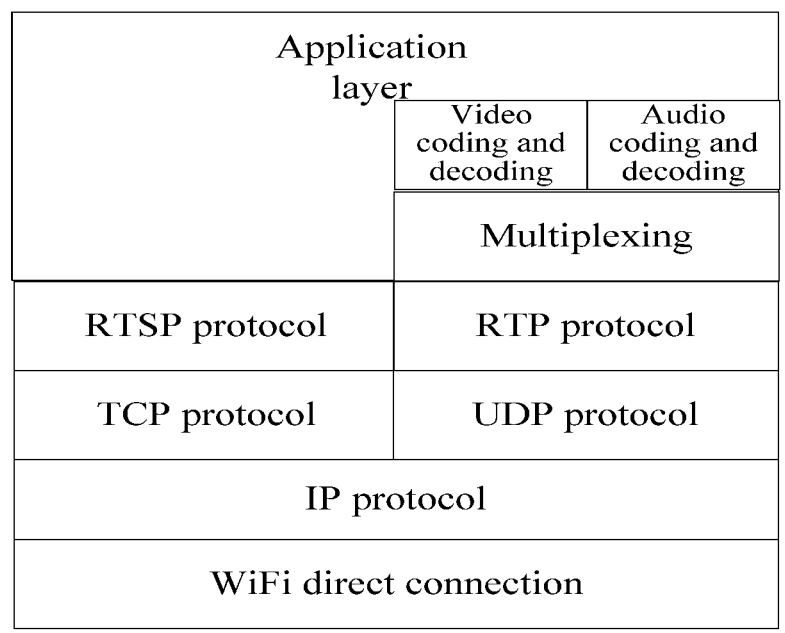
FIG. 4 shows a block diagram of architecture for a method for interaction between a pair of smart glasses and a smart device according to an embodiment of the present application.

As shown in FIG. 4, the architecture for the method for interaction between a pair of smart glasses and a smart device includes, from the bottom up, a physical link layer, a network layer, a transmission layer, a multiplexing layer and an application layer.

By using a WiFi direct connection at the physical link layer, there is no restriction by a router, and wireless devices interconnect in a point-to-point manner. Moreover, greater improvement is achieved in terms of a transmission speed and a transmission distance than via Bluetooth.

An IP protocol is used at the network layer, and a TCP\UDP protocol is used at the transmission layer. Herein, TCP is used for transmitting a control signaling so as to ensure reliability of control. RTSP and RTP are used for ensuring that communication is reliable and is performed in real time. RTSP provides an extensible framework, so that transmission is under control and real-time data is able to pass through an IP network efficiently. In this way, multimedia data can be transmitted.

Then, a multiplexing layer, coding and decoding of an audio and coding and decoding of a video are provided at an upper layer. At an uppermost layer is a user application, which is configured to present and control multimedia.

Figure 5:
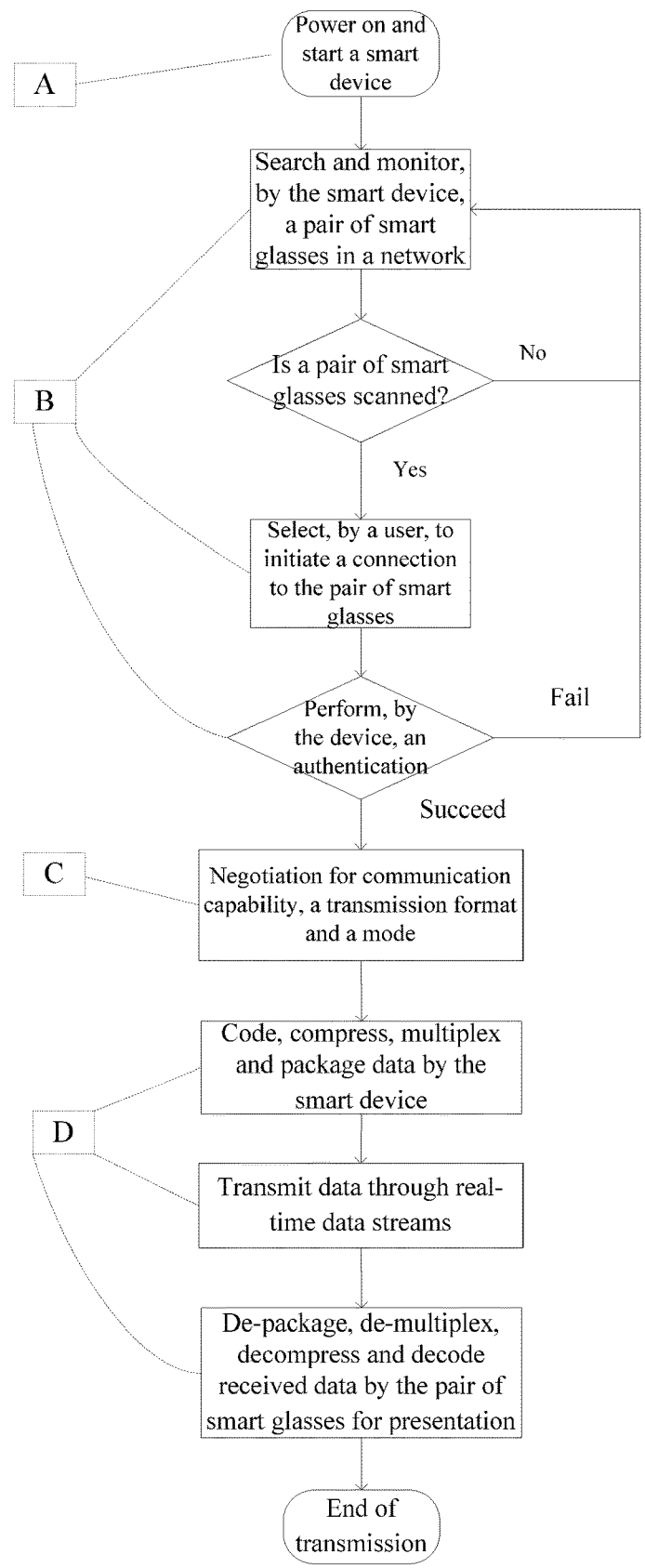
FIG. 5 shows a flowchart of interaction between a pair of smart glasses and a smart device according to an embodiment of the present application.

A flow of interaction between a pair of smart glasses and a smart device is described by taking the smart device sharing data to the pair of smart glasses as an example, as shown in FIG. 5.

A. Powering-On Process

The pair of smart glasses and a system of the device are powered on and started, and a wireless transmission module and an audio and video module (the foregoing modules may be arranged according to functional needs) are respectively initiated.

B. Establishment of a WiFi Direct Communication Channel

A WiFi direct connection service of two devices is started. When searching the pair of smart glasses, the smart device may send a signal to the channel and monitor a response result by a monitor apparatus. By using a WiFi direct connection manner, a one-to-one direct connection may be realized without support of a router. Moreover, a WiFi direct connection standard will support all WiFi devices and support a frequency of 2.4 GHz or 5 GHz. A transmission speed and a coverage scope of a traditional WiFi (a highest rate of 802.11n) may be realized, and a WPA2 standard may be adopted for encryption.

C. Communication Negotiation

This communication manner follows an RTSP which supports real-time data. The RTSP itself does not transmit continuous media streams, but plays a role of a controller for a multi-media server. Specifically, contents of the communication negotiation include information such as the transmission format, the audio and video encoding format, playing of URL information, whether to use an RTP transmission in a TCP mode and so on. For control and negotiation of transmission, an RTSP channel is used to ensure reliability of a control signaling. For a bidirectional control, a procedure of applying for a control right is added on the basis of RTSP. When a sending terminal receives a message of applying for the control right from a receiving terminal, the sending terminal releases the control right and meanwhile confirms termination of current data transmission, so as to complete switching of a data transmission direction and of the control right.

D. Transmission and Presentation on a Screen

From the perspective of the sending terminal, the entire process of data interaction includes: first compressing data to be sent to package the data into a packetized elementary stream (PES) format, then performing fusion and multiplexing to the data in an MPEG2-TS manner and adding an RTP header, and at last transmitting the data in a UDP/IP manner.

The receiving party de-packages, de-multiplexes and decompresses received data so as to present, for example, multimedia data.

In addition, either one of the pair of smart glasses and the smart device may initiate a disconnection.

Compared with an existing technology in which a pair of smart glasses performs interaction on the basis of a physical layer of Bluetooth, the present disclosure proposes an implementation solution based a WiFi direct connection technology, so that a transmission speed of interaction may reach up to more than 1 M/s and that broadband is no longer a bottleneck. The embodiment of the present disclosure uses protocol groups that are improved and optimized continuously in practice, so that both real-time interaction and security and reliability of the interaction can be ensured; and performing mirroring transmission of the multimedia data as well as saving the data in real time can both be implemented. According to an interactive bidirectional control solution proposed in the present disclosure, the control right may be switched during one connection, so that bidirectional transmission and control between the smart device and the pair of smart glasses can be realized. The smart device may share an audio and a video as well as an application presentation to the pair of smart glasses, and meanwhile the pair of smart glasses may also transmit information such as a shot image to the smart device.

An embodiment of the present disclosure further proposes an interaction system, which includes a pair of smart glasses and a smart device. Herein, after a WiFi direct communication connection is established between the pair of smart glasses and the smart device, a communication negotiation is performed between the pair of smart glasses and the smart device, and data transmission is performed between the pair of smart glasses and the smart device based on the WiFi direct communication connection and a result of the communication negotiation.

An embodiment of the present disclosure further proposes an interaction system, which includes a pair of smart glasses, a smart device, a memory, and a processor. A computer program is stored on the memory, and when the computer program is run by the processor, the processor executes steps of: establishing a communication connection between the pair of smart glasses and the smart device via WiFi; performing a communication negotiation between the pair of smart glasses and the smart device; and performing data transmission between the pair of smart glasses and the smart device based on the communication negotiation.

The smart device may be a terminal device having a wireless communication connection function, such as a mobile phone, an iPad, a computer and so on.

Figure 6:
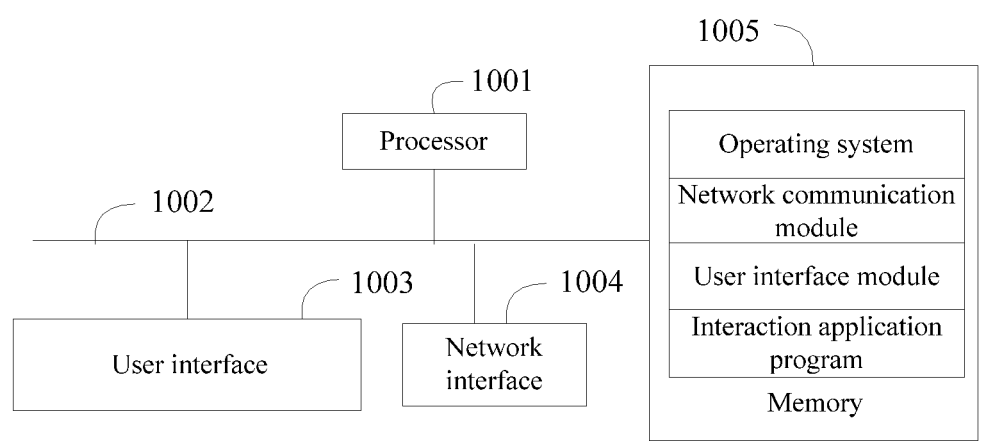
FIG. 6 schematically shows a structure of a terminal according to an embodiment of the present application.

According to FIG. 6, a terminal, at which a system for interaction between the pair of smart glasses and the smart device according to the present embodiment is located, includes a processor 1001 (such as a CPU), a network interface 1004, a user interface 1003, a memory 1005 and a communication bus 1002. The communication bus 1002 provides a communication connection between these components. The user interface 1003 may include a display screen and an input unit (such as a keyboard). The user interface 1003 may further include a wired interface and a wireless interface that are standard. The network interface 1004 may optionally include a wired network interface and a wireless network interface (such as a WiFi interface) that are standard. The memory 1005 may be a high-speed RAM memory, and may also be a nonvolatile memory such as a disk memory. The memory 1005 may be a memory device that is independent of the processor 1001.

Those skilled in the art may appreciate that a structure of the terminal shown in FIG. 6 does not constitute a limitation to the terminal. The terminal may include more components or less components than those illustrated in the drawing, or combine some components, or have a different arrangement of the components.

As shown in FIG. 6, the memory 1005, as a computer storage medium, may include an operation device, a network communication module, a user interface module, and an application program for interaction between the pair of smart glasses and the smart device.

In the terminal shown in FIG. 6, the network interface 1004 is used for connecting with a network servicer and performing data communication with the network servicer; the user interface 1003 is used for connecting with a client terminal (a user terminal) and performing data communication with the client terminal; the processor 1001 is used for invoking a computer program for interaction between the pair of smart glasses and the smart device stored in the memory 1005 and executing a method for interaction between the pair of smart glasses and the smart device according to various embodiments of the present disclosure.

In addition, an embodiment of the present disclosure further proposes a computer readable storage medium provided thereon with a computer program. When the computer program is run by the processor, the processor executes the method for interaction between the pair of smart glasses and the smart device according to various embodiments of the present disclosure.

Those ordinary skilled in the art may appreciate that a functional module/unit in all or some steps in the method, the system, and the device disclosed above may be implemented as software, firmware, hardware, and suitable combinations thereof. In a hardware implementation manner, division of functional modules/units mentioned in the above description does not necessarily correspond to division of physical components. For example, one physical component may have multiple functions, or one function or step may be executed by cooperation of several physical components. Some or all of the physical components may be implemented as software executed by a processor, such as a central processor, a digital signal processor or a microprocessor, or implemented as hardware, or implemented as an integrated circuit, such as a special integrated circuit. Such software may be distributed on a computer readable medium. The computer readable medium may include a computer storage medium (or non-transitory medium) and a communication medium (or transitory medium). As is well known to those ordinary skilled in the art, the term computer storage medium includes volatile and nonvolatile, removable and non-removable mediums implemented in any method or technology for storing information (such as a computer readable instruction, a data structure, a program module or other data). The computer storage medium includes, but is not limited to: RAM, ROM, EEPROM, flash memory or other memory technologies; CD-ROM, digital versatile disc (DVD) or other optical disc storage; magnetic cassette, magnetic tape, magnetic disk storage or other magnetic storage devices; or any other medium that may be used to store desired information and may be accessed by the computer. Moreover, it is known to those skilled in the art that the communication medium typically includes a computer readable instruction, a data structure, a program module, or other data in a modulated data signal, such as a carrier wave or other transport mechanisms, and may include any information delivery medium.

The above description covers only preferred embodiments of the present invention, and is not intended to limit the patent scope of the present invention. Any equivalent change to the structure or the process based on the description and the drawings of the present disclosure or application to other relevant technical fields directly and indirectly both fall into the patent protection scope of the present disclosure in a similar way.

The invention claimed is:

1. A method for interaction between a pair of smart glasses and a smart device, comprising steps of:
    establishing a WiFi direct communication connection between the pair of smart glasses and the smart device;
    performing a communication negotiation between the pair of smart glasses and the smart device; and
    performing data transmission between the pair of smart glasses and the smart device based on the WiFi direct communication connection and a result of the communication negotiation,
    wherein the contents of the communication negotiation further comprise a negotiation to a transmission control right, and the method further comprises a step of:
    performing, by the pair of smart glasses and the smart device, switching of control to the data transmission based on a negotiated transmission control right.

2. The method for interaction between a pair of smart glasses and a smart device according to claim 1, wherein the step of establishing a WiFi direct communication connection between the pair of smart glasses and the smart device comprises steps of:
    sending, by the smart device, a search signal in a communication channel to which the smart device belongs to, monitoring whether a pair of smart glasses exists in the communication channel to which the smart device belongs to, and displaying to a user a list of a pair of smart glasses generated based on a pair of smart glasses which is detected;
    selecting, by the smart device, a pair of smart glasses to be connected after a selection instruction of the user is received, initiating a connection, and performing an authentication; and
    establishing the WiFi direct communication connection between the pair of smart glasses and the smart device after the authentication is performed successfully.

3. The method for interaction between a pair of smart glasses and a smart device according to claim 2, wherein the step of performing data transmission between the pair of smart glasses and the smart device comprises steps of:
    compressing and multiplexing, by a sending party, data to be sent, adding a header of a real-time transport protocol, and then sending the data to a receiving party in a UDP/IP manner; and
    de-packaging, de-multiplexing and decompressing, by the receiving party, received data so as to present and save the data,
    wherein the sending party is one of the pair of smart glasses and the smart device, and the receiving party is the other one of the pair of smart glasses and the smart device.

4. The method for interaction between a pair of smart glasses and a smart device according to claim 3, wherein contents of the communication negotiation comprise at least one of a transmission format, an audio and video encoding format, and a transmission mode.

5. The method for interaction between a pair of smart glasses and a smart device according to claim 3, wherein after the step of performing data transmission between the pair of smart glasses and the smart device, the method further comprises steps of:
    sending, by the sending party, an instruction of disconnecting the communication connection, and
    disconnecting, by the receiving party, the communication connection according to the instruction.

6. The method for interaction between a pair of smart glasses and a smart device according to claim 1, wherein the step of performing, by the pair of smart glasses and the smart device, switching of control to the data transmission based on a negotiated transmission control right comprises steps of:
    sending, by the sending party, a message of applying for the transmission control right to the receiving party; and
    releasing, by the receiving party, the current control right after the message of applying for the transmission control right from the sending party is received, and meanwhile confirming termination of current data transmission, so as to complete switching of a data transmission direction and of the control right.

7. An interaction system, comprising: a pair of smart glasses, a smart device, a memory, and a processor, wherein a computer program is stored on the memory, and when the computer program is run by the processor, the processor executes the method for interaction between a pair of smart glasses and a smart device according to claim 1.

8. An interaction system, comprising a pair of smart glasses and a smart device, wherein
    after a WiFi direct communication connection is established between the pair of smart glasses and the smart device, a communication negotiation is performed between the pair of smart glasses and the smart device, and
    data transmission is performed between the pair of smart glasses and the smart device based on the WiFi direct communication connection and a result of the communication negotiation,
    wherein the contents of the communication negotiation further comprise a negotiation to a transmission control right, and
    the pair of smart glasses and the smart device perform switching of control to the data transmission based on a negotiated transmission control right.

9. The interaction system according to claim 8, wherein the smart device sends a search signal in a communication channel to which the smart device belongs to, monitors whether a pair of smart glasses exists in the communication channel to which the smart device belongs to, and displays to a user, if a pair of smart glasses exists in the communication channel, a list of a pair of smart glasses generated based on a pair of smart glasses which is detected;

after receiving a selection instruction of the user, the smart device selects a pair of smart glasses to be connected, initiates a connection, and performs an authentication; and after the authentication is performed successfully, the WiFi direct communication connection is established between the pair of smart glasses and the smart device.

10. The interaction system according to claim 9, wherein a sending party compresses and multiplexes data to be sent, adds a header of a real-time transport protocol, and then sends the data to a receiving party in a UDP/IP manner; and the receiving party de-packages, de-multiplexes and decompresses received data so as to present and save the data, wherein the sending party is one of the pair of smart glasses and the smart device, and the receiving party is the other one of the pair of smart glasses and the smart device.

11. The interaction system according to claim 10, wherein contents of the communication negotiation comprise at least one of a transmission format, an audio and video encoding format, and a transmission mode.

12. The interaction system according to claim 10, wherein the sending party sends an instruction of disconnecting the communication connection, and the receiving party disconnects the communication connection according to the instruction.

13. The interaction system according to claim 8, wherein the sending party sends a message of applying for the transmission control right to the receiving party; and the receiving party releases the current control right after receiving the message of applying for the transmission control right from the sending party, and meanwhile confirms termination of current data transmission, so as to complete switching of a data transmission direction and of the control right.

* * * * *